J. A. DRURY.
STEERING DEVICE FOR TONGUES.
APPLICATION FILED OCT. 19, 1912.
1,064,060.
Patented June 10, 1913.
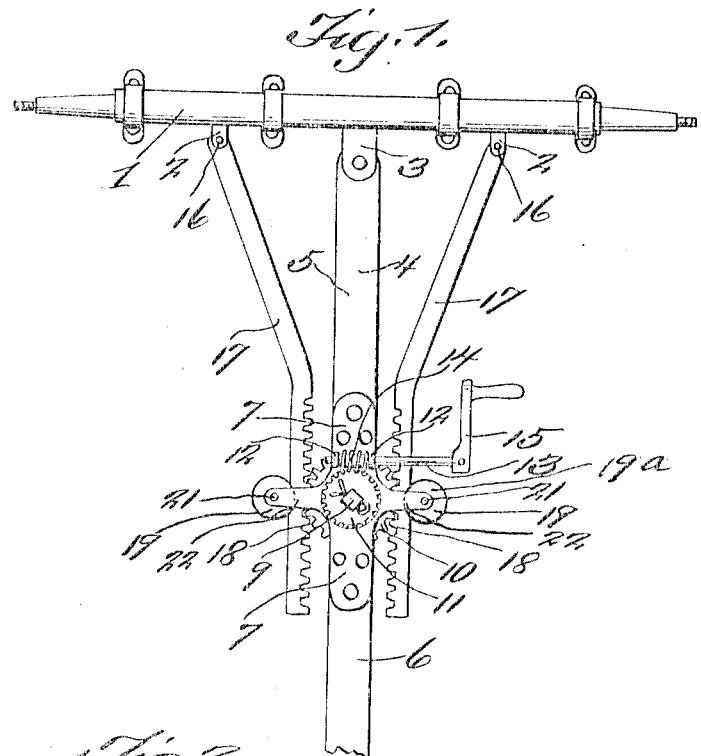
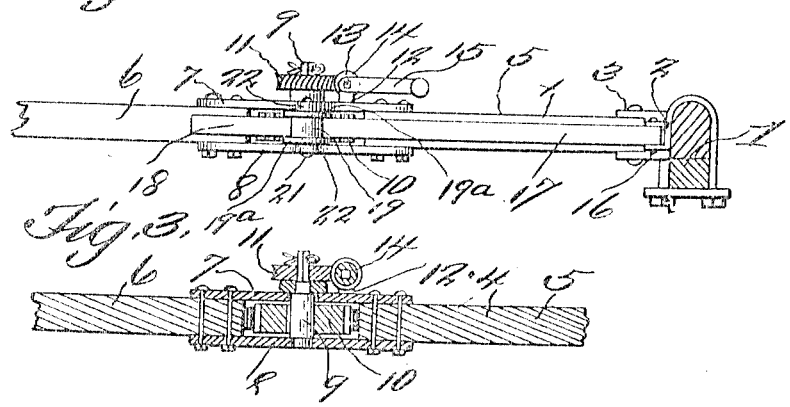
Witnesses
Inventor
Joseph A. Drury,
his Attorneys

UNITED STATES PATENT OFFICE.

JOSEPH A. DRURY, OF WYKOFF, MINNESOTA.

STEERING DEVICE FOR TONGUES.

1,064,060.  Specification of Letters Patent.  Patented June 10, 1913.

Application filed October 19, 1912. Serial No. 726,754.

*To all whom it may concern:*

Be it known that I, JOSEPH A. DRURY, a citizen of the United States, residing at Wykoff, in the county of Fillmore and State of Minnesota, have invented a new and useful Steering Device for Tongues; and I do hereby declare the following to be a full, clear, and exact description of the invention, such as will enable others skilled in the art to which it appertains to make and use the same.

This invention relates to a new and useful steering apparatus, adapted for use in connection with tongues of grain threshers, clover hullers, corn threaders, and hay presses, and the like.

As one of the objects of the invention, it is the aim to provide a sectional tongue having a coupling steering device connecting the two sections of the tongue, whereby as a crank shaft is rotated, the front axle and its wheels will be guided.

The invention comprises further features and combination of parts, as hereinafter set forth, shown in the drawings and claimed.

In the drawings:—Figure 1 is a plan view, showing the application of the improved steering apparatus. Fig. 2 is a side elevation. Fig. 3 is a view in side elevation and partly in section of the improved steering apparatus.

Referring more especially to the drawings 1 designates the front axle of any form or construction of vehicle having the clevis members 2 and 3, the clevis members 2 being carried by the axle adjacent its ends, while the clevis member 3 is arranged centrally of the axle. Pivoted in the clevis member 3 is the tongue 4, which comprises the two sections 5 and 6 connected together by the plates 7 and 8, one secured above and the other below. Journaled in bearings of said plates is a shaft 9, upon the lower end of which a gear 10 is keyed. This gear 10 is located between the plates 7 and 8, while upon the upper portion of the shaft a worm wheel 11 is keyed. Mounted in bearings 12 of the plate 7 is a shaft 13 having a worm 14 at one end to mesh with the worm wheel 11, and a crank 15 at the other end, it being obvious that the crank turns or rotates the shaft 13, which imparts movement to the shaft 9 through the medium of the worm and worm wheel. Pivoted at 16 to the clevis members 2 are bars 17, which terminate in racks 18, which mesh with the gear 10, there being rollers 19 to hold the racks in engagement with the gear. The rollers are mounted upon the pins 21, which are journaled in extensions of the plates 7 and 8. The extensions are designated by the numerals 22.

As the shaft 9 is rotated, the gear 10 is in turn rotated, which will move each rack in one direction or the other, which in turn will oscillate the axle 1 in the desired direction.

From the foregoing it will be noted that there has been devised a simple and efficient steering mechanism for tongues of threshing machines and the like, and one which has been found practical.

The invention having been set forth, what is claimed as new and useful is:—

In combination, an axle, a tongue pivoted centrally to the axle, the tongue comprising two sections, a pair of plates connecting the sections, one above and one below, a shaft journaled in said plates and provided with a gear wheel on its lower portion between the adjacent ends of the sections and between the plates, a worm wheel on the upper portion of said shaft, the plates having lateral extensions, racks meshing with the gear, one upon each side of the tongue, each rack having pivotal connections with one end of the axle, rollers journaled between the lateral extensions, one upon each side of the tongue, for holding the racks in mesh with the gear, and means mounted in bearings of one of said plates for rotating the worm wheel.

In testimony whereof I have signed my name to this specification in the presence of two subscribing witnesses.

JOSEPH A. DRURY.

Witnesses:
 FRED WENDORF,
 JOHN WENDORF.